US012579099B2

(12) United States Patent
Liu et al.

(10) Patent No.: US 12,579,099 B2
(45) Date of Patent: Mar. 17, 2026

(54) CONTROL LEVEL TAGGING METHOD AND SYSTEM

(71) Applicant: Alipay (Hangzhou) Information Technology Co., Ltd., Hangzhou (CN)

(72) Inventors: Weijie Liu, Hangzhou (CN); Zhi Li, Hangzhou (CN); Hongliang Tian, Hangzhou (CN); Shoumeng Yan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/824,014

(22) Filed: Sep. 4, 2024

(65) Prior Publication Data

US 2025/0077471 A1 Mar. 6, 2025

(30) Foreign Application Priority Data

Sep. 4, 2023 (CN) .......................... 202311137630.9

(51) Int. Cl.
*G06F 16/11* (2019.01)
(52) U.S. Cl.
CPC .................................... *G06F 16/11* (2019.01)
(58) Field of Classification Search
CPC ..... G06F 16/11; G06F 21/6218; G06F 21/604
See application file for complete search history.

300

(56) References Cited

U.S. PATENT DOCUMENTS

| | | | | |
|---|---|---|---|---|
| 8,595,237 | B1* | 11/2013 | Chaudhary | ............. G06F 16/14 707/741 |
| 2006/0117049 | A1* | 6/2006 | Jain | ........................ G06F 16/13 |
| 2019/0171841 | A1* | 6/2019 | Steinfeld | ............... G06F 21/629 |
| 2020/0042366 | A1* | 2/2020 | Ganesh | ............... G06F 9/45545 |
| 2020/0257810 | A1* | 8/2020 | Vrabec | .................... G06F 21/53 |
| 2020/0274881 | A1* | 8/2020 | Lukanov | ............... H04L 63/105 |
| 2022/0179959 | A1* | 6/2022 | Silveira | ................... G06F 21/57 |
| 2024/0289303 | A1* | 8/2024 | Vedovati | ............... G06F 16/137 |

* cited by examiner

*Primary Examiner* — Marc S Somers
(74) *Attorney, Agent, or Firm* — Womble Bond Dickinson (US) LLP

(57) ABSTRACT

A method comprises: determining a container directory entry in a container virtual file system corresponding to a container, where the container virtual file system is configured to manage at least one file corresponding to the container, and has a container directory entry that reflects a hierarchical relationship between the at least one file; and tagging the container directory entry in the container virtual file system as a first control level, to make a distinction from a control level of a directory entry that is different from that in the container virtual file system and that is in a host virtual file system of a processing device, where the host virtual file system is configured to manage files in the processing device, and has a directory entry that reflects a hierarchical relationship between the files in the processing device.

14 Claims, 5 Drawing Sheets

Determine a container directory entry in a container virtual file system corresponding to a container — 310

Tag the container directory entry in the container virtual file system as a first control level, to make a distinction from a control level of a directory entry that is different from that in the container virtual file system and that is in a host virtual file management system of a processing device — 320

300

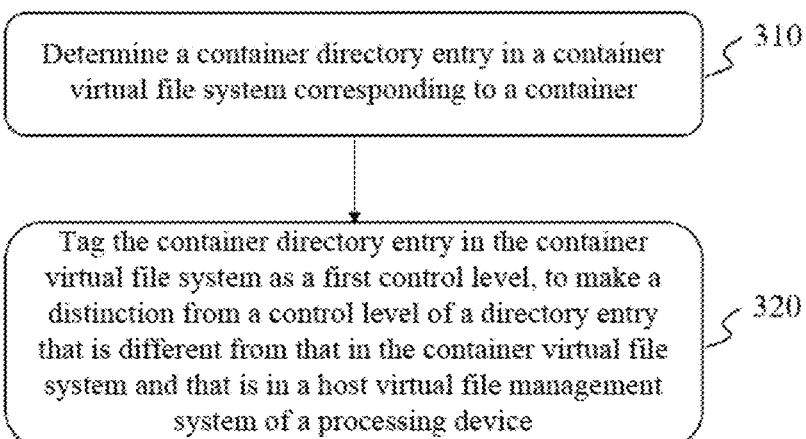

Determine a container directory entry in a container virtual file system corresponding to a container ⟍ 310

Tag the container directory entry in the container virtual file system as a first control level, to make a distinction from a control level of a directory entry that is different from that in the container virtual file system and that is in a host virtual file management system of a processing device ⟍ 320

FIG. 3

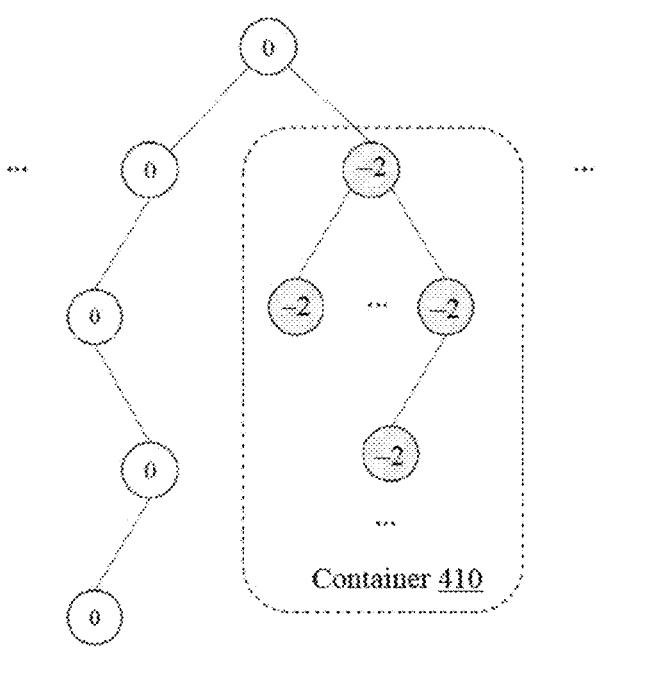

Container 410

FIG. 4

CONTROL LEVEL TAGGING METHOD AND SYSTEM

TECHNICAL FIELD

This specification relates to the field of computer technologies, and in particular, to a file-system based control level tagging method and system.

BACKGROUND

A container technology is a virtual technology that can effectively improve the utilization of internal resources of a computer, and can "package" application programs and their dependencies together to form a portable and self-contained running environment. The container technology achieves advantages such as fast start, a lightweight, and portability by sharing system resources of the computer (or referred to as a processing device or a host machine), and becomes an important part of cloud computing, cloud native, and other technologies.

However, a file system isolation effect of a current container technology is poor, and there are vulnerabilities that are easily exploited by attackers. Therefore, some embodiments of this specification provide a file-system based control level tagging method and system, to compensate for the isolation effect and improve system security.

SUMMARY

One or more embodiments of this specification provide a control level tagging method performed by a processor in a processing device. The method includes: determining a container directory entry in a container virtual file system corresponding to a container, where the container virtual file system is configured to manage at least one file corresponding to the container, and has a container directory entry that reflects a hierarchical relationship between the at least one file; and tagging the container directory entry in the container virtual file system as a first control level, to make a distinction from a control level of a directory entry that is different from that in the container virtual file system and that is in a host virtual file system of the processing device, where the host virtual file system is configured to manage files in the processing device, and has a directory entry that reflects a hierarchical relationship between the files in the processing device.

One or more embodiments of this specification provide a control level tagging system, including: a determining module, configured to determine a container directory entry in a container virtual file system corresponding to a container, where the container virtual file system is configured to manage at least one file corresponding to the container, and has a container directory entry that reflects a hierarchical relationship between the at least one file; and a first tagging module, configured to tag the container directory entry in the container virtual file system as a first control level, to make a distinction from a control level of a directory entry that is different from that in the container virtual file system and that is in a host virtual file system of a processing device, where the host virtual file system is configured to manage files in the processing device, and has a directory entry that reflects a hierarchical relationship between the files in the processing device.

One or more embodiments of this specification provide a control level tagging apparatus, including a processor and a storage medium. The storage medium is configured to store computer instructions, and the processor is configured to process at least some of the computer instructions, to implement the above-mentioned control level tagging method.

One or more embodiments of this specification provide a storage medium that stores computer instructions. When at least some of the computer instructions are executed by a processor, the above-mentioned control level tagging method is implemented.

BRIEF DESCRIPTION OF DRAWINGS

This specification is further described by using example embodiments, and these example embodiments are described in detail with reference to the accompanying drawings. These embodiments are not limiting. In these embodiments, the same reference numerals represents the same structures.

FIG. 3 is an example flowchart of a control level tagging method according to some embodiments of this specification;

FIG. 4 is a schematic diagram of a control level tagging effect according to some embodiments of this specification;

DESCRIPTION OF EMBODIMENTS

Figure 1:
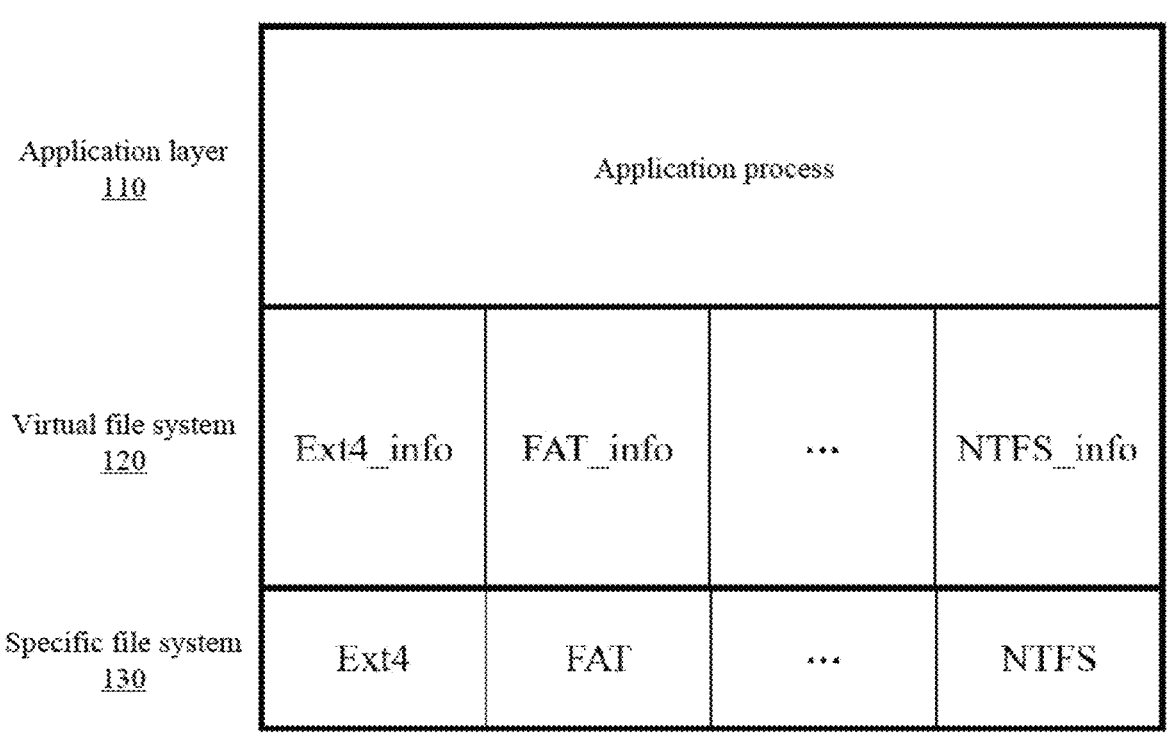
FIG. 1 is a schematic diagram of a file management structure in a computer device according to some embodiments of this specification.

To describe the technical solutions in embodiments of this specification more clearly, the following briefly describes the accompanying drawings needed for describing the embodiments. Clearly, the accompanying drawings in the following descriptions merely show some examples or embodiments of this specification, and a person of ordinary skill in the art can still apply this specification to other similar scenarios based on these accompanying drawings without creative efforts. Unless clearly learned from the language environment or otherwise stated, the same reference numerals in the drawings represent the same structures or operations.

It should be understood that the terms "system", "apparatus", "unit", and/or "module" used in this specification are used to distinguish between different components, elements, parts, portions, or assemblies of different levels. However, if other words can achieve the same purpose, the words can be replaced by other expressions.

As shown in this specification and the claims, unless an exception is explicitly indicated in the context, the words such as "one", "a", "an", and/or "the" do not specifically indicate singular forms and can also include plural forms. Usually, the terms "include" and "comprise" only indicate steps and elements that are explicitly identified, these steps and elements do not constitute an exclusive list, and the method or the device may further include other steps or elements.

A flowchart is used in this specification to describe operations performed by a system according to the embodiments of this specification. It should be understood that previous or subsequent operations are not necessarily performed precisely in a sequence. Instead, steps can be processed in a reverse sequence or processed simultaneously. In addition, other operations can be added to these processes, or one operation or several operations can be removed from these processes.

A container technology is a virtual technology that can effectively improve the utilization of internal resources of a computer, and can "package" application programs and their dependencies together to form a portable and self-contained running environment. A container implements isolation and resource sharing by using a namespace. The namespace can isolate a view of a process, so that system resources "viewed" by the process in the container are independent of system resources of a host or another container, without being affected by other processes. The system resources include hardware resources such as a CPU and a memory of a computer, and software resources such as file data. In some embodiments, a namespace technology provides a PID namespace for isolating a container process ID. The PID namespace is in a one-to-one correspondence with a container, and a process ID of the same PID namespace is an ID of a process in a corresponding container. Specifically, in a PID namespace, process IDs are numbered starting from 1, and process IDs in different PID namespaces do not interfere with each other. The namespace technology further provides a mount namespace for isolating a container file system. The mount namespace is also in a one-to-one correspondence with a container, so that each container has its own independent file system. This isolation can make an application program feel like it is running in an independent system when running in a container, without being affected by a host machine or another container.

Container runtime is software used to start and run a container in a computer device, and provides underlying system support and management for the container. The container runtime runs outside the container, and can be considered as a host machine or a host process. For example, when a container needs to be created, the container runtime allocates (or copies) some files in a host file system to a root directory of a container file for the container by invoking a kernel function of a host operating system, to encapsulate or isolate the container file. The container runtime can further implement interaction between the container and the host. For example, the container runtime can copy a computation result of a container process from the container file to a host file, to output container data. In addition, as a host process, the container runtime can execute files in the container.

However, the container is untrusted relative to the host machine. A file system isolation mechanism used in the container technology is not sufficient to meet container management needs, and host-container interfaces such as the container runtime are likely to be exploited by attackers. In an example, in a host-container interaction process, the container runtime may access a symbolic link (Symlink, also referred to as a soft link, which is equivalent to a shortcut to another file or directory) in a container file system to perform reading from or writing into the container file system. The attacker can design a symbolic link in the container to deceive the container runtime into locating outside the container file system and accessing sensitive information (for example, an account password) on the host. Further, the sensitive information can be copied through the container runtime to a host file that can be accessed by the attacker, to obtain the sensitive information on the host (this process can also be referred to as a path access attack). For another example, the file in the container can also be executed by a host process (for example, the container runtime) during host-container interaction. However, this execution behavior may cause a malicious executable file in the container to function in host context, thereby inducing container escape.

Therefore, some embodiments of this specification provide a control level tagging method. A control level tag is added to a virtual file system to effectively isolate a specific container file, thereby enhancing a container isolation mechanism and improving system security.

FIG. 1 is a schematic diagram of a file management structure in a computer device according to some embodiments of this specification. As shown in FIG. 1, a file (or referred to as a specific file for distinguishing) in the computer device is stored on a hard disk or a disk, and is managed and maintained by a file system such as Ext4, NTFS, or FAT. The specific file and the file system form a specific file system 130. There is a virtual file system 120 above the specific file system 130. The virtual file system (VFS) is configured to manage files in the computer device, and a unified file system interface is provided for use by users and application programs. There is an application layer 110 above the virtual file system 120. The application layer 110 includes processes of various application programs. The specific file system 130 registers a correlation function that implements the virtual file system with the virtual file system by using a pointer (for example, Ext4_info, NTFS_info, or FAT_info), so that an application program or an application process can switch to various file systems through the virtual file system to access specific files.

Figure 2:
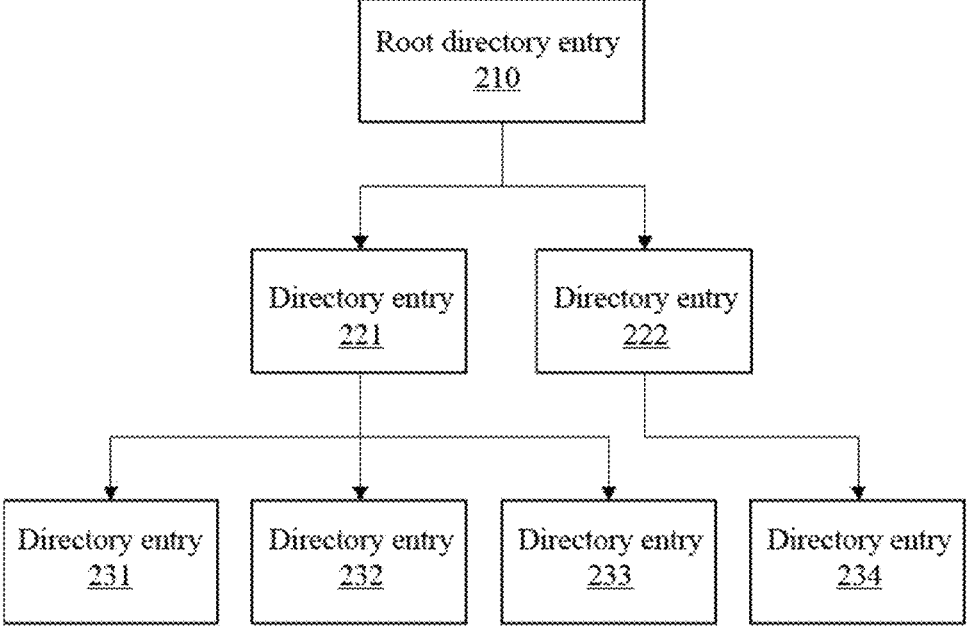
FIG. 2 is a schematic diagram of a directory entry hierarchy structure according to some embodiments of this specification.

A Linux system is used as an example, and a virtual file system of the Linux system can further include objects such as a superblock, an inode, and a dentry. The superblock mainly stores information about a file system structure on a physical disk, and describes a size of each portion. The inode reflects general metadata information in a file system object. The metadata information can include a file size, a device identifier, a user identifier, a user group identifier, a file mode, an extended attribute, a timestamp for reading or modifying a file, and the like. The inode is in a one-to-one correspondence with a file (a folder is also considered as a file). When a file is created, an inode is allocated to the file. The dentry is a directory entry, is used to indicate a folder (an intermediate directory entry) or a final specific file (which can be considered as a leaf directory entry), and can reflect a hierarchical relationship between files in the computer device. The dentry can be specifically represented as a structure that includes a directory name, an inode number, a file type, and other meta information. The dentry structure further includes a pointer to a parent directory and a pointer to a linked list head of all files (files and folders) included in the directory entry. These two pointers enable directory operations (for example, returning to a parent directory and entering a child directory) to be implemented. A plurality of directory entries together can form a directory tree (dentry tree). FIG. 2 is a schematic diagram of a dentry tree according to some embodiments of this specification. The dentry tree includes a root directory entry (for example, a directory entry 210), an intermediate node directory entry (for example, a directory entry 221, a directory entry 222), and a leaf directory entry (for example, a directory entry 231, a directory entry 232, a directory entry 233, and a directory entry 234).

The directory entry describes a logical attribute of a file, does not actually correspond to descriptions on a disk, and is designed to improve search performance. For example, if a file "c:/xxx/yyy.txt" is to be opened, "c:", "xxx", and "yyy.txt" are all directory entries. During path search, a VFS finds an inode of each corresponding directory entry based on directory entries layer by layer, and then performs an operation along the directory entry to find the final file. In view of this, in some embodiments of this specification, a directory entry or a dentry in a virtual file system is tagged (or referred to as "colored"), to enhance isolation of a container file without affecting use of a specific file. The following describes the tagging method in detail with reference to FIG. 3.

FIG. 3 is an example flowchart of a control level tagging method according to some embodiments of this specification. In some embodiments, the procedure 300 shown in FIG. 3 can be performed by a processor in a computer device or a processing device, for example, can be implemented by a control level tagging system 800 deployed on the computer device. As shown in FIG. 3, the procedure 300 includes the following steps.

Step 310: Determine a container directory entry in a container virtual file system corresponding to a container. In some embodiments, step 310 can be implemented by a determining module 810.

The container virtual file system is relative to a host virtual file system. For more descriptions of the virtual file management system, refer to the related descriptions in FIG. 1. When no special descriptions are provided, the virtual file management system is a host virtual file management system in a host machine or the processing device. When a container is created, container runtime "allocates" some of host files to the container by invoking a kernel function of the host machine. A mount namespace can isolate a file system mount point in the container, and isolate an independent file system environment for the container. A partial virtual file system corresponding to the container is referred to as the container virtual file system. Essentially, the container virtual file system is a portion of the host virtual file management system. Therefore, a characteristic and a principle of the virtual file management system in the related descriptions in FIG. 1 are also applicable to the container virtual file management system. A directory entry in the container virtual file system is the container directory entry.

In some embodiments, the container directory entry can be determined when the container is created. When the container is created, the container runtime invokes a kernel function of an operating system of the processing device to switch a container process to a root directory of the container file system, so that the container process can access a container file. Linux is used as an example, and the kernel function can be a pivot_root function. The pivot_root function has two input parameters: a target directory and a process identifier, and a function of the pivot_root function is to switch a process corresponding to the process identifier to the target directory. The container runtime invokes the pivot_root function, inputs the container process and a root directory entry of the container virtual file system to the function as input parameters, and can switch the container process to the container root directory by executing the pivot_root function. Therefore, within the pivot_root function, a container root directory entry can be obtained. In some embodiments of this specification, additional instructions can be added to the function to determine whether the target directory is a container file mount point. If the target directory is a container file mount point, the target directory is used as a container root directory entry in the container virtual file system, and all container directory entries in the container root directory entry are determined based on the container root directory entry. Specifically, the directory entry has a pointer to a linked list head of all files (files and folders) included in the directory entry, and all the directory entries in the container root directory entry can be determined by using the pointer. As previously described, the directory entry can be represented by a structure. In some embodiments, the directory entry structure has a file mount point tag to indicate whether the directory entry is a container file mount point. Therefore, the container directory entry in the container root directory entry can be determined based on the file mount point tag in the directory entry. For example, a directory entry that has a file mount point tag indicating that the directory entry is a container file mount point can be determined as the container directory entry. For another example, if the file mount point tag in the directory entry structure does not indicate that the directory entry is a mount point of another file (for example, a shared volume file), the directory entry can be determined as the container directory entry.

Step 320: Tag the container directory entry in the container virtual file system as a first control level, to make a distinction from a control level of a directory entry that is different from that in the container virtual file system and that is in the host virtual file system of the processing device. In some embodiments, step 320 can be implemented by a first tagging module 820.

The container is untrusted relative to the host machine. Therefore, the first control level can be tagged for the container directory entry, to make a distinction from another directory entry in the host virtual file system. In some embodiments, the another directory entry can be tagged as a second control level or a third control level. The first control level means that a stronger control measure is needed. For example, access permission is reduced, an identity authentication requirement for an access object is enhanced, or when an access object accesses a directory entry at the first control level or a file in a directory entry at the first control level, certain subsequent behaviors of the access object are restricted. In some embodiments, the access object can be a process or a user.

In some embodiments, the first control level can be added to the container directory entry structure. Specifically, a control level tagging entry can be extended in the structure, and a first value (for example, −2) can be assigned to the tagging entry, to represent the first control level.

In some other embodiments, a control level entry can be added to a PID namespace of the container, and the control level entry can be set to a first value, for example, −2. The PID namespace can also be represented by a structure. Therefore, the control level entry can be added to the PID namespace, and a value can be assigned. Correspondingly, a control level tagging entry can be added to the container directory entry structure, and a pointer to the PID namespace (for example, a pointer to the PID namespace structure) can be assigned to the control level tagging entry of the container directory entry.

FIG. 4 is a schematic diagram of a control level tagging effect according to some embodiments of this specification. In the figure, a node represents a directory entry in the host virtual file system, a node with diagonal shading is a container directory entry, and an unfilled node is a directory entry outside the container. After the procedure 300 is performed, the container directory entry in the container 410 is tagged as the first control level.

The procedure 300 can be performed when a container is created. In this way, whenever a new container is created, the first control level can be assigned to a container directory entry in a timely manner. Then, a specially designed access control policy can be used to isolate a container file based on the control level, to eliminate the exploitation of host-container interface vulnerabilities. In some embodiments, the procedure 300 can be implemented by computer code, and the procedure is implemented by a system kernel as an operating system patch. As described above, step 310 can be implemented in a kernel function. Similarly, step 320 can be implemented in the kernel function by adding additional instructions. Alternatively, step 320 can be implemented by computer code and encapsulated into an independent function for the kernel function to call.

In some embodiments, a shared volume can be created in the computer device, and the shared volume has its own file system environment. Specifically, the container runtime can additionally create a shared volume based on a container creation requirement, to "expand" the container to some extent. However, unlike the container file system, a file in the shared volume can be jointly accessed by a host process and a container process of a specified container. The host process herein includes a host process different from the container runtime. For example, the file in the shared volume is accessed by an application process, different from the container runtime, running on the host machine. In some embodiments, a shared volume file can be mounted to a container directory entry, for example, can be mounted to a container root directory, or can be mounted to another container directory. Mounting descriptions of the shared volume file can also be found in the related descriptions in FIG. 5. A virtual file system corresponding to the shared volume file can be referred to as a shared volume virtual file system, and also has the characteristic and the principle of the virtual file system described in FIG. 1. A directory entry in the shared volume virtual file system can be referred to as a shared volume directory entry. The file in the shared volume can be accessed by the host process and the container process, and can be considered as a semi-open area. In consideration of efficiency priority, it is not appropriate to set a stricter control level. Therefore, the second control level can be tagged for the shared volume directory entry. The second control level means a control measure weaker than that at the first control level.

The shared volume file is mounted to the container directory entry or to the container virtual file system. Therefore, the shared volume directory entry can be found and determined in the container root directory. In some embodiments, the step of determining the shared volume directory entry can be implemented by a determining module in the control level tagging system 800. For related descriptions of determining the container root directory entry, refer to FIG. 4. Details are not described herein again. After the container root directory entry is determined, all directory entries in the container root directory entry can be determined. In some embodiments, a shared volume directory entry in the container root directory entry can be determined based on a file mount point identifier in the directory entry. For example, a directory entry that has a file mount point tag indicating that the directory entry is a shared volume file mount point can be determined as the shared volume directory entry.

In some embodiments, the second control level can be added to a shared volume directory entry structure. The step of tagging a control level for the shared volume directory entry can be implemented by the first tagging module 820. Specifically, a control level tagging entry can be extended in the structure, and a second value (for example, −1) can be assigned to the tagging entry, to represent the second control level.

Unlike the container, a PID namespace corresponding to the shared volume is not created when the shared volume is created. In some other embodiments, to tag a control level for the shared volume directory entry, a PID namespace can be created for the shared volume directory entry. A PID namespace structure corresponding to the shared volume has a control level entry, a value of −1 can be assigned to the control level entry, and another entry in the PID namespace structure of the shared volume can be set to a null value. Correspondingly, a control level tagging entry can be added to the shared volume directory entry structure, and a pointer to the PID namespace of the shared volume is assigned to the control level tagging entry of the shared volume directory entry.

In some embodiments, a directory entry that is different from those in the container virtual file system and the shared volume virtual file system and that is in the host virtual file system can be tagged as the third control level. The third control level is lower than the second control level. In some embodiments, the step of tagging a control level for the directory entry different from those in the container virtual file system and the shared volume virtual file system can be implemented by the first tagging module 820. In an example, the third control level can be added to a directory entry structure that is different from the container directory entry and the shared volume directory volume and that is in the host virtual file system. Specifically, a control level tagging entry can be extended in the structure, and a third value (for example, 0) can be assigned to the tagging entry, to represent the third control level.

Figure 5:
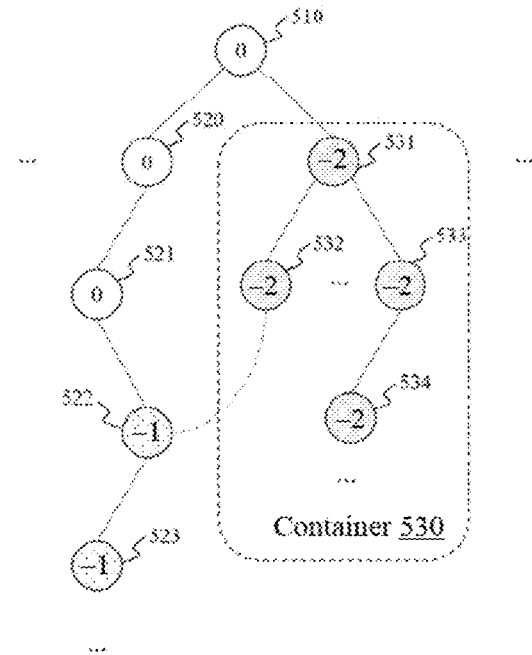
FIG. 5 is a schematic diagram of a control level tagging effect according to some other embodiments of this specification.

FIG. 5 is a schematic diagram of a control level tagging effect according to some other embodiments of this specification. In the figure, a node represents a directory entry in the host virtual file system, a node 522 and a node 523 represent shared volume directory entries, and a node 531, a node 532, a node 533, and a node 534 represent container directory entries. It can be intuitively learned from FIG. 5 that the shared volume directory entry is from the host virtual file management system, is allocated to the shared volume, and is mounted to the container directory entry 532. After control level tagging in the above-mentioned embodiment of this specification is performed, in the container 530, the container directory entry (that is, the node 531, the node 532, the node 533, and the node 534) is tagged as the first control level, the shared volume directory entry (that is, the node 522 and the node 523) is tagged as the second control level, and the remaining directory entries (for example, a node 510, a node 520, and a node 521) are tagged as the third control level.

In the above-mentioned embodiment, the directory entry in the virtual file system is statically tagged, and tagging can be completed when the container and the shared volume are created. In some embodiments, a directory entry different from the container directory entry and the shared volume directory entry in the virtual file system does not necessarily need to be tagged. When a control level is not specified, the control level can be considered to be the third control level by default.

Path search is a prerequisite step for accessing a target file. For example, when "open c:/xxx/yyy.txt" is performed in the computer device, an operating system kernel first performs path search, and then passes through at least one layer of directory entry to locate the target file, for example, "yyy.txt". Then, a step of processing a final path search result (for example, a complete-walk kernel function) is performed to access the target file. In some embodiments, the target file may be a "malicious" symbolic link in the container file, and points to sensitive information on the host. The container deceives the container runtime into accessing the symbolic link, to copy the sensitive information on the host to another host file that can be accessed by an attacker, so as to steal privacy data on the computer device. Since a host process such as the container runtime has access permission for the container file and the host file, if there is only a basis of a static tagging result, even if the symbolic link is tagged as the first control level, the container runtime can still access the symbolic link, and access a sensitive information file on the host through the symbolic link. To eliminate this phenomenon, some embodiments of this specification further provide a control level tagging method for a path. When an operating system performs path access, a control level is tagged for a path. In some embodiments, the step of tagging a control level for a path can be implemented by a second tagging module 830 in the control level tagging system 800.

During path search, the VFS performs an operation along directory entries layer by layer to find the final file. Therefore, in some embodiments, a control level of an initial directory entry obtained during path search can be used as a current security level of the path; when a next directory entry is obtained, if a control level of the next directory entry is higher than a current control level of the path, the control level of the next directory entry is used as the current control level of the path; and so on, until a control level of a complete path from the initial directory entry to the final file is obtained.

More specifically, Linux is used as an example. In a path search process, a Linux kernel creates an intermediate data structure named "nameidata", to store an intermediate result, for example, a directory entry on a path, obtained when a search process starts. For example, during each time of search, all directory entries on the path are parsed one by one, and a result is stored in the "nameidata" structure by using a path_to_nameidata kernel function. In some embodiments of this specification, a control level of an initial directory entry obtained during path search can be simultaneously added to the "nameidata" structure as a path control level entry. When a next directory entry is found, the directory entry is stored in the "nameidata" structure, and a control level of the directory entry is compared with a current path control level entry. If the control level of the directory entry is higher, the control level of the directory entry replaces the path control level entry. This process continues until the final file is found and a path control level of a complete path is obtained.

Figure 6:
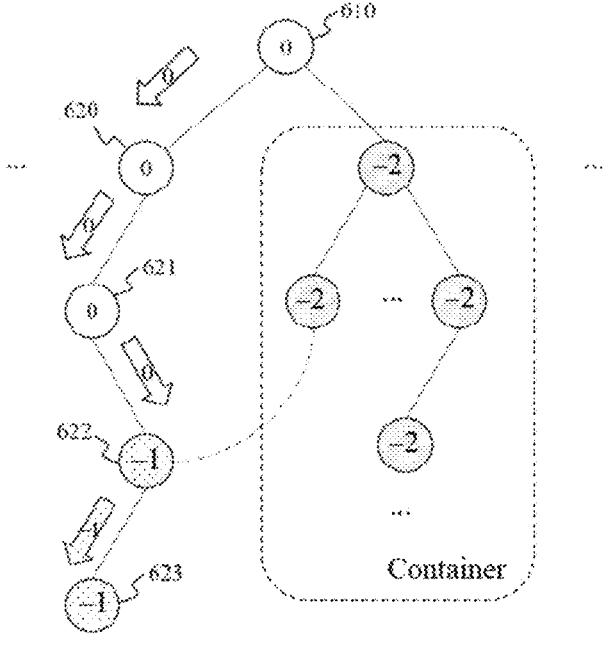
FIG. 6 is a schematic diagram of a path tagging effect according to some embodiments of this specification.
Figure 7:
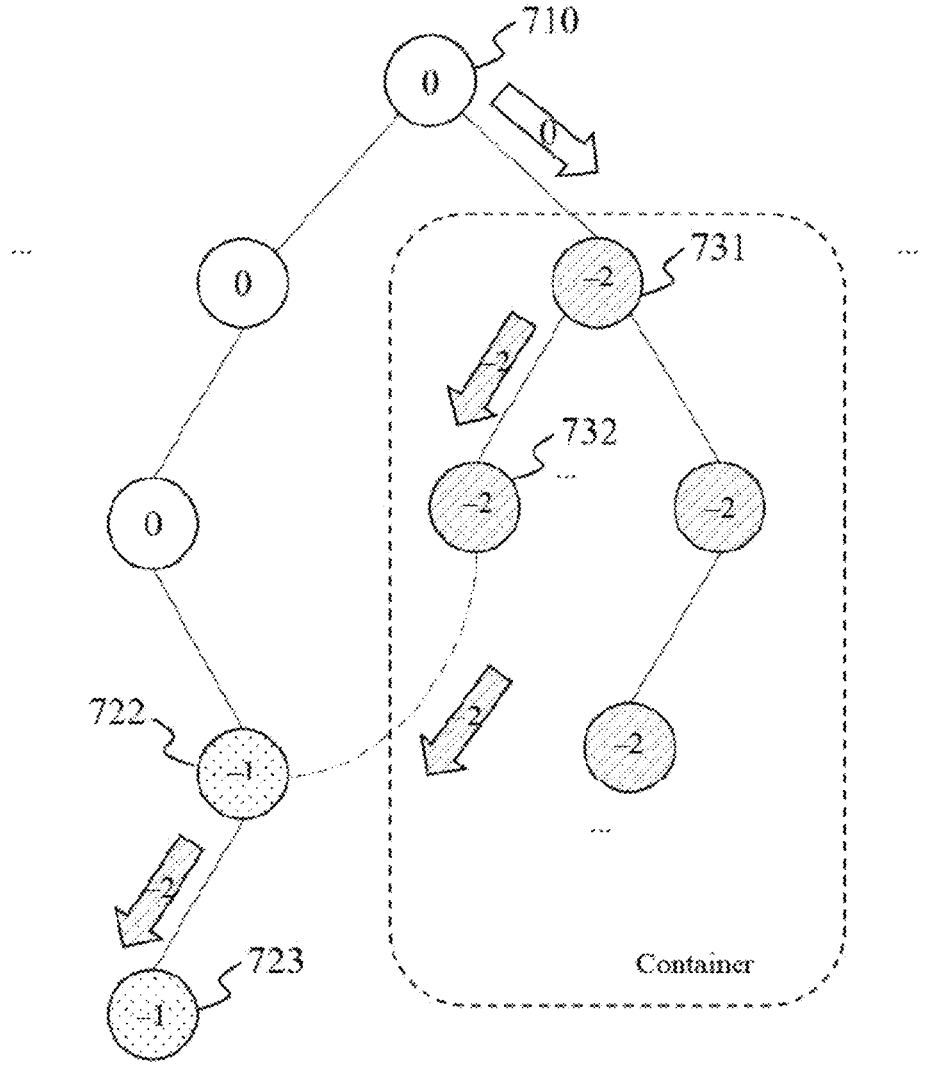
FIG. 7 is a schematic diagram of a path tagging effect according to some other embodiments of this specification.

FIG. 6 and FIG. 7 are respectively schematic diagrams of two path tagging effects according to some embodiments of this specification. In the figure, a node represents a directory entry, and an arrow represents a file access path obtained during path search. As shown in FIG. 6, path search starts from a node 610, and sequentially passes through a node 620, a node 621, and a node 622 to reach a final file 623. According to the path control level tagging method in the above-mentioned embodiment, a path control level sequentially changes from the third control level (the value of 0) to the second control level (−1). As shown in FIG. 7, path search starts from a node 710, and sequentially passes through a node 731, a node 732, and a node 722 to reach a final file 723. According to the path control level tagging method in the above-mentioned embodiment, a path control level sequentially changes from the third control level (the value of 0) to the first control level (−2).

In some embodiments, path access attacks and container escape are effectively eliminated by using dynamic access control policies. For example, after path search is completed and before the complete-walk step is performed, it can be determined whether the path control level is the third control level. If the path control level is the third control level, the complete-walk step is not performed, to prevent the container runtime from accessing the "malicious" symbolic link in the container, and avoid a case in which container escape is induced because the container runtime executes a malicious executable file that can function in host context and that is in the container.

Figure 8:
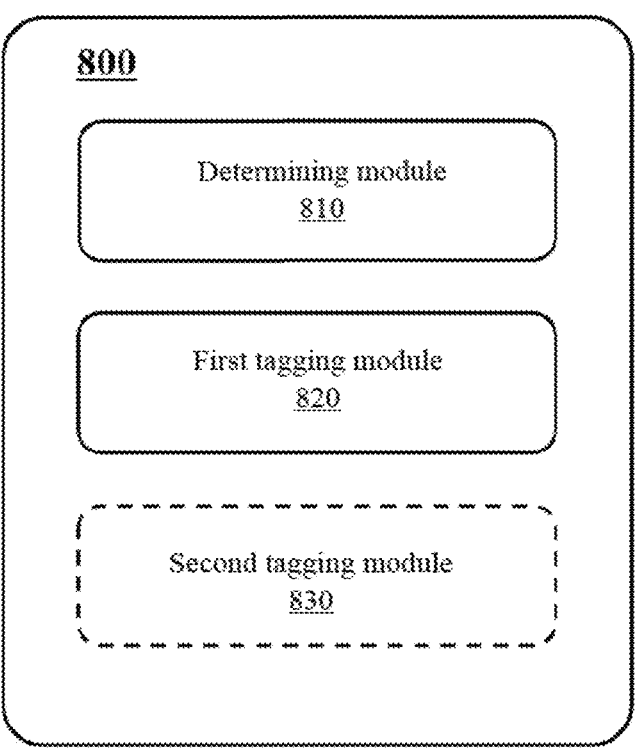
FIG. 8 is a schematic block diagram of a control level tagging system according to some embodiments of this specification.

FIG. 8 is a schematic block diagram of a control level tagging system according to some embodiments of this specification. As shown in FIG. 8, the control level tagging system 800 can include a determining module 810 and a first tagging module 820. In some optional embodiments, the control level tagging system 800 can further include a second tagging module 830.

The determining module 810 is configured to determine a container directory entry in a container virtual file system corresponding to a container. The container virtual file system is configured to manage at least one file corresponding to the container, and has a container directory entry that reflects a hierarchical relationship between the at least one file.

The first tagging module 820 is configured to tag the container directory entry in the container virtual file system as a first control level, to make a distinction from a control level of a directory entry that is different from that in the container virtual file system and that is in a host virtual file management system of a processing device. The host virtual file management system is configured to manage files in the processing device, and has a directory entry that reflects a hierarchical relationship between the files in the processing device.

The second tagging module 830 is configured to tag a control level for a path when path search is performed on a target file.

For more content of the modules, refer to related descriptions in FIG. 3 and other steps. Details are not described herein again. It should be understood that the system and the modules in the system shown in FIG. 8 can be implemented in various manners. For example, in some embodiments, the system and the modules in the system can be implemented by hardware, software, or a combination of software and hardware. The hardware part can be implemented by using dedicated logic. The software part can be stored in a memory and executed by an appropriate instruction execution system, for example, a microprocessor or specially designed hardware. In some embodiments, the modules can be implemented by computer code and embedded in a related kernel function of an operating system, or can be encapsulated into an independent function and invoked by a kernel function. A person skilled in the art can understand that the above-mentioned methods and systems can be implemented by using computer-executable instructions and/or control code included in the processor. For example, such code is provided on a carrier medium such as a disk, a CD, or a DVD-ROM, a programmable memory such as a read-only memory (firmware), or a data carrier such as an optical or electronic signal carrier. The system and the modules in the system in this specification can be implemented not only by a hardware circuit of an ultra-large-scale integrated circuit or gate array, a semiconductor such as a logic chip or a transistor, or a programmable hardware device such as a field programmable gate array or a programmable logic device, but also by software executed by various types of processors, or can be implemented by a combination (for example, firmware) of the hardware circuit and software.

It should be noted that the previous descriptions of the system and the modules in the system are for case of description only, and this specification should not be limited to the scope of the enumerated embodiments. It can be understood that after understanding the principle of the system, a person skilled in the art may randomly combine the modules or form a subsystem to be connected to another module without departing from the principle, or split some modules to obtain more modules or a plurality of units in the modules. Such variations all fall within the protection scope of this specification.

In some embodiments, the control level tagging system 800 can be encapsulated into an operating system patch, and the patch is installed to enable an operating system on a computer device to achieve an effect of strengthening a container isolation mechanism.

Beneficial effects that may be brought by the embodiments of this specification include but are not limited to the following: (1) A control level is tagged for a directory entry in a virtual file system, so that file access permission can be effectively controlled without affecting access or an operation performed by an application layer on a specific file. (2) A control level is tagged for a PID namespace, and then a control level tagging entry is extended in a container directory entry or a shared volume directory entry, so that the control level tagging entry points to the corresponding PID namespace, to facilitate subsequent process access right control. (3) A control level is dynamically tagged for a path, and path access attacks and container escape can be effectively prevented by using subsequent access control policies.

Basic concepts have been described above. Clearly, for a person skilled in the art, the above-mentioned detailed disclosure is merely an example, but does not constitute a limitation on this specification. Although not explicitly stated herein, a person skilled in the art may make various modifications, improvements, and amendments to this specification. Such modifications, improvements, and amendments are proposed in this specification. Therefore, such modifications, improvements, and amendments still fall within the spirit and scope of the example embodiments of this specification.

In addition, specific words are used in this specification to describe the embodiments of this specification. For example, "one embodiment", "an embodiment", and/or "some embodiments" mean/means a feature, structure, or characteristic related to at least one embodiment of this specification. Therefore, it should be emphasized and noted that "an embodiment", "one embodiment" or "an alternative embodiment" mentioned twice or more times at different locations in this specification does not necessarily refer to the same embodiment. In addition, some features, structures, or characteristics in one or more embodiments of this specification can be appropriately combined.

In addition, unless explicitly stated in the claims, the order of the processing elements and sequences, the use of numbers and letters, or the use of other names described in this specification is not intended to limit the order of the procedures and methods described in this specification. Although some embodiments of the invention currently considered useful are discussed in various examples in the above-mentioned disclosure, it should be understood that such details are merely used for illustrative purposes. The appended claims are not limited to the disclosed embodiments, and instead, the claims are intended to cover all amendments and equivalent combinations that conform to the essence and scope of the embodiments of this specification. For example, although the system components described above can be implemented by a hardware device, the system components can also be implemented by a software solution, for example, installing the described system on an existing server or mobile device.

Similarly, it should be noted that to simplify the description disclosed in this specification and help understand one or more embodiments of this specification, in the above descriptions of the embodiments of this specification, a plurality of features are sometimes incorporated into one embodiment, drawing, or descriptions of the embodiment and the drawing. However, the present disclosure method does not mean that features needed by the object in this specification are more than the features mentioned in the claims. In fact, the features of the embodiments are less than all features of individual embodiments disclosed above.

Numbers describing quantities of components and attributes are used in some embodiments. It should be understood that such numbers used for the description of the embodiments are modified in some examples by modifiers such as "about", "approximately", or "generally". Unless otherwise stated, "about", "approximately", or "generally" indicates that a change of ±20% is allowed for the number. Correspondingly, in some embodiments, numeric parameters used in this specification and the claims are approximations, and the approximations can change based on characteristics needed by some embodiments. In some embodiments, the numeric parameters should take into account the specified significant digits and use a general digit retention method. Although in some embodiments of this specification, numeric domains and parameters used to determine the ranges of the embodiments are approximations, in specific implementations, such values are set as precisely as possible in a feasible range.

Each patent, patent application, and patent application publication and other materials such as articles, books, specifications, publications, or documents are incorporated into this specification here by reference in their entireties, except for the historical application documents inconsistent or conflicting with the content of this specification, and the documents (attached to this specification currently or later) that limit the widest scope of the claims of this specification. It should be noted that if the description, definition, and/or use of the terms in the attachments of this specification are inconsistent or conflict with the content of this specification, the description, definition, or use of the terms of this specification shall prevail.

Finally, it should be understood that the embodiments described in this specification are merely used to describe the principles of the embodiments of this specification. Other variations can also fall within the scope of this specification. Therefore, by way of example instead of limitation, alternative configurations of the embodiments of this specification can be considered to be consistent with the teachings of this specification. Correspondingly, the embodiments of this specification are not limited to the embodiments expressly described in this specification.

The invention claimed is:

1. A control level tagging method, performed by a processor in a processing device, wherein the method comprises:

determining a container directory entry in a container virtual file system corresponding to a container, wherein the container virtual file system is configured to manage at least one file corresponding to the container, and has a container directory entry that reflects a hierarchical relationship between the at least one file;

tagging the container directory entry in the container virtual file system as a first control level, to make a distinction from a control level of a directory entry that is different from that in the container virtual file system and that is in a host virtual file system of the processing device, wherein the host virtual file system is configured to manage files in the processing device, and has a directory entry that reflects a hierarchical relationship between the files in the processing device; and tagging a control level for a path when path search is performed on a target file;

wherein tagging the control level for the path when path search is performed on the target file comprises:

using a control level of an initial directory entry obtained during path search as a current security level of the path; and when a next directory entry is obtained, upon determining that a control level of the next directory entry is higher than a current control level of the path, using the control level of the next directory entry as the current control level of the path; and so on, until a control level of a complete path from the initial directory entry to the target file is obtained, wherein the first control level is higher than another control level;

wherein tagging the container directory entry in the container virtual file system as the first control level comprises:

adding a control level entry to a process ID (PID) namespace of the container;

setting the control level entry to a first value;

adding a control level tagging entry to the container directory entry in the container virtual file system; and setting the control level tagging entry as a pointer to the PID namespace.

2. The method according to claim 1, which the method is performed when a container is created in the processing device.

3. The method according to claim 1, wherein the directory entry is represented by a first structure that comprises a parent directory entry pointer; and wherein determining the container directory entry in the container virtual file system corresponding to the container comprises:

obtaining a target directory in a kernel function of the processing device;

determining whether the target directory is a container file mount point; and in response to the target directory being the container file mount point, determining the target directory as a container root directory entry in the container virtual file system, and determining a container directory entry in the container root directory entry based on the container root directory entry.

4. The method according to claim 1, further comprising:

determining a shared volume directory entry in a shared volume virtual file system of a shared volume, wherein the shared volume virtual file system is configured to manage at least one file corresponding to the shared volume, and has a shared volume directory entry that reflects a hierarchical relationship between the at least one file, and the at least one file corresponding to the shared volume is capable of being accessed by a container process in the container and a host process on the processing device; and tagging the shared volume directory entry in the shared volume virtual file system as a second control level, wherein the second control level is lower than the first control level.

5. The method according to claim 4, wherein the directory entry is represented by a first structure that comprises a parent directory entry pointer and a file mount point identifier; and wherein determining the shared volume directory entry in the shared volume virtual file system corresponding to the shared volume comprises:

obtaining a target directory in a kernel function of the processing device;

determining whether the target directory is a container file mount point; and in response to the target directory being the container file mount point, determining the target directory as a container root directory entry in the container virtual file system, determining a directory entry in the container root directory entry based on the container root directory entry, and determining the shared volume directory entry in the container root directory entry based on the file mount point identifier in the directory entry.

6. The method according to claim 5, wherein tagging the shared volume directory entry in the shared volume virtual file system as the second control level comprises:

creating a process ID (PID) namespace for the shared volume;

adding a control level entry to the PID namespace of the shared volume;

setting the control level entry to a second value;

adding a control level tagging entry to the shared volume directory entry in the shared volume virtual file system; and setting the control level tagging entry as a pointer to the PID namespace of the shared volume.

7. The method according to claim 4, further comprising:

tagging a directory entry that is different from those in the container virtual file system and the shared volume virtual file system and that is in the host virtual file system as a third control level, wherein the third control level is lower than the second control level.

8. A control level tagging apparatus, comprising a processor and a storage medium, wherein the storage medium is configured to store computer instructions, and the processor is configured to process at least some of the computer instructions to cause the processor to perform a method comprising:

determining a container directory entry in a container virtual file system corresponding to a container, wherein the container virtual file system is configured to manage at least one file corresponding to the container, and has a container directory entry that reflects a hierarchical relationship between the at least one file;

tagging the container directory entry in the container virtual file system as a first control level, to make a distinction from a control level of a directory entry that is different from that in the container virtual file system and that is in a host virtual file system of the control level tagging apparatus, wherein the host virtual file system is configured to manage files in the control level tagging apparatus, and has a directory entry that reflects a hierarchical relationship between the files in the control level tagging apparatus; and tagging a control level for a path when path search is performed on a target file;

wherein tagging the control level for the path when path search is performed on the target file comprises:

using a control level of an initial directory entry obtained during path search as a current security level of the path; and when a next directory entry is obtained, upon determining that a control level of the next directory entry is higher than a current control level of the path, using the control level of the next directory entry as the current control level of the path; and so on, until a control level of a complete path from the initial directory entry to the target file is obtained, wherein the first control level is higher than another control level;

wherein tagging the container directory entry in the container virtual file system as the first control level comprises:

adding a control level entry to a process ID (PID) namespace of the container;

setting the control level entry to a first value;

adding a control level tagging entry to the container directory entry in the container virtual file system; and setting the control level tagging entry as a pointer to the PID namespace.

9. The apparatus according to claim 8, wherein the method is performed when a container is created in the control level tagging apparatus.

10. The apparatus according to claim 8, wherein the directory entry is represented by a first structure that comprises a parent directory entry pointer, and wherein determining the container directory entry in the container virtual file system corresponding to the container comprises:

obtaining a target directory in a kernel function of the control level tagging apparatus;

determining whether the target directory is a container file mount point; and in response to the target directory being the container file mount point, determining the target directory as a container root directory entry in the container virtual file system, and determining a container directory entry in the container root directory entry based on the container root directory entry.

11. The apparatus according to claim 8, wherein the method further comprises:

determining a shared volume directory entry in a shared volume virtual file system of a shared volume, wherein the shared volume virtual file system is configured to manage at least one file corresponding to the shared volume, and has a shared volume directory entry that reflects a hierarchical relationship between the at least one file, and the at least one file corresponding to the shared volume is capable of being accessed by a container process in the container and a host process on the control level tagging apparatus; and tagging the shared volume directory entry in the shared volume virtual file system as a second control level, wherein the second control level is lower than the first control level.

12. The apparatus according to claim 11, wherein the directory entry is represented by a first structure that comprises a parent directory entry pointer and a file mount point identifier; and wherein determining the shared volume directory entry in the shared volume virtual file system of the shared volume comprises:

obtaining a target directory in a kernel function of the control level tagging apparatus;

determining whether the target directory is a container file mount point; and in response to the target directory being the container file mount point, determining the target directory as a container root directory entry in the container virtual file system, determining a directory entry in the container root directory entry based on the container root directory entry, and determining the shared volume directory entry in the container root directory entry based on the file mount point identifier in the directory entry.

13. The apparatus according to claim 12, wherein tagging the shared volume directory entry in the shared volume virtual file system as the second control level comprises:

creating a process ID (PID) namespace for the shared volume;

adding a control level entry to the PID namespace of the shared volume;

setting the control level entry to a second value;

adding a control level tagging entry to the shared volume directory entry in the shared volume virtual file system; and setting the control level tagging entry as a pointer to the PID namespace of the shared volume.

14. The apparatus according to claim 11, wherein the method further comprises:

tagging a directory entry that is different from those in the container virtual file system and the shared volume virtual file system and that is in the host virtual file system as a third control level, wherein the third control level is lower than the second control level.

* * * * *